US008130217B2

(12) United States Patent
Nishimizu et al.

(10) Patent No.: US 8,130,217 B2

(45) Date of Patent: Mar. 6, 2012

(54) DISPLAY PANEL DRIVING APPARATUS

(75) Inventors: Manabu Nishimizu, Oita (JP); Yuushi Shutou, Oita (JP); Hideaki Hasegawa, Ibaraki (JP); Koji Higuchi, Ibaraki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 312 days.

(21) Appl. No.: 12/620,253

(22) Filed: Nov. 17, 2009

(65) Prior Publication Data

US 2010/0123704 A1 May 20, 2010

(30) Foreign Application Priority Data

Nov. 20, 2008 (JP) ................................ 2008-296951

(51) Int. Cl.
*G06F 3/038* (2006.01)

(52) U.S. Cl. ...................................................... 345/211

(58) Field of Classification Search ........................ None
See application file for complete search history.

(56) References Cited

U.S. PATENT DOCUMENTS 5,973,660 A 10/1999 Hashimoto
2008/0316160 A1 * 12/2008 Jang et al. ....................... 345/94

FOREIGN PATENT DOCUMENTS

JP 10-062744 3/1998

* cited by examiner

*Primary Examiner* — Paul Huber

(74) *Attorney, Agent, or Firm* — Taft Stettinius & Hollister LLP

(57) ABSTRACT

The present disclosure provides a display panel driving apparatus that can make the circuit layout surface area smaller, and prevent circuit damage. The display panel driving apparatus includes a source amplifier, a sink amplifier, a switch and the like. The source amplifier includes a first output circuit, a second output circuit and the like, and a guard transistor is provided between the first output circuit and the second output circuit to prevent an output signal voltage of the first output circuit from becoming less than an intermediate voltage. The sink amplifier includes a first output circuit and a second output circuit, and a guard transistor is provided between the first output circuit and the second output circuit to prevent an output signal voltage of the first output circuit from exceeding an intermediate voltage.

11 Claims, 11 Drawing Sheets

609

DISPLAY PANEL DRIVING APPARATUS

CROSS-REFERENCE TO RELATED APPLICATIONS

This application is based on and claims priority under 35 U.S.C. §119 from Japanese Patent Application No. 2008-296951, filed on Nov. 20, 2008 the disclosure of which is incorporated by reference herein.

RELATED ART

1. Field of the Disclosure

The present disclosure relates to a display panel driving apparatus. In particular the present disclosure relates to a display panel driving apparatus of a liquid crystal panel or the like.

2. Description of the Related Art

Previously, when driving display panels, such as for example liquid crystal panels, display has been achieved by applying a voltage to a liquid crystal panel, in accordance with a graduation level of image data. In such cases, in order to prevent deterioration of the characteristics of the liquid crystal materials, the voltage for application is inverted with a constant periodicity.

For example, a liquid crystal driving circuit provided with a high voltage side amplifier and a low voltage side amplifier is described in Japanese Patent Application Laid-Open (JP-A) No. 10-62744.

According to the disclosure in JP-A No. 10-62744, the voltage ranges of the high voltage side amplifier and the low voltage side amplifier are narrower in comparison to cases where the amplifiers are not assigned to the high voltage side and the low voltage side. Therefore, according to JP-A No. 10-62744, power consumption can be reduced.

Along with recent increases in screen sizes for liquid crystal display devices, improvements are being demanded in various characteristics of driving apparatuses for driving liquid crystal panels. In particular, the load capacity of data lines of liquid crystal panels is increasing with the increase in screen size of liquid crystal display devices. This means that it is important to raise the driving performance of driving apparatuses. In order to address this issue, for example, plural output stages connected together in parallel within an amplifier could be considered.

Consequently, in order to achieve a reduction in consumption power as well as an improvement in driving ability, configuration with a high voltage side amplifier and a low voltage side amplifier has been proposed, such as described in JP-A No 10-62744, with driving circuits within each of the amplifiers having plural output stages connected together in parallel.

A schematic configuration of such a driving circuit is shown FIG. 10. A driving circuit 200 of a display panel shown in FIG. 10 includes a source amplifier 202, a sink amplifier 204 and a switch 206. The source amplifier 202 is a high voltage side amplifier that outputs a voltage in a positive polarity output range having an upper limit of VDD, which is the highest voltage of the power source range of the driving circuit, and a lower limit of an intermediate voltage VDM, which is an intermediate voltage between the VDD and VSS (ground), which is the lowest voltage of the power source range. The sink amplifier 204 is a low voltage side amplifier that outputs a voltage in a negative polarity output range, having a lower limit of voltage VSS and an upper limit of voltage VDM. The source amplifier 202 includes a first high voltage side output circuit 202A, a second high voltage side output circuit 202B, and the like. In the first high voltage side output circuit 202A a PMOS transistor P1 and an NMOS transistor N1 are connected together in series. In the second high voltage side output circuit 202B a PMOS transistor P2 and an NMOS transistor N2 are connected together in series. The sink amplifier 204 includes a first low voltage side output circuit 204A, a second low voltage side output circuit 204B, and the like. In the first low voltage side output circuit 204A a PMOS transistor P3 and an NMOS transistor N3 are connected together in series. In the second low voltage side output circuit 204B a PMOS transistor P4 and an NMOS transistor N4 are connected together in series. In this manner, the output circuits of both the source amplifier 202 and the sink amplifier 204 are configured in two stages.

The withstand voltage of each of the MOS transistors is a voltage at least capable of withstanding the difference between the voltage VDD and the voltage VSS, and they are MOS transistors with high withstand voltages. Namely, the voltage VDD is applied to the back gates of the PMOS transistors of each of the output circuits. The voltage VSS is applied to the back gates of each of the NMOS transistors thereof.

In the switch 206, when, for example, an input polarity signal POL is at a high level (referred to below as 'H'), an output signal voltage SOAMP is output from the source amplifier 202 to an output terminal OUT1. The switch 206 also outputs an output signal voltage STAMP from the sink amplifier 204 to an output terminal OUT2. However, when the input polarity signal POL is at a low level (referred to as 'L' below), the switch 206 outputs the output signal voltage SOAMP from the source amplifier 202 to the output terminal OUT2. The switch 206 also outputs the output signal voltage STAMP from the sink amplifier 204 to the output terminal OUT1.

However, in the drive circuit 200 configured as shown in FIG. 10, each of the MOS transistors configuring the output circuit in the first stage and the output circuit in the second stage of each of the amplifiers, employs a MOS transistor of high withstand voltage. Consequently, the layout surface area of each of the amplifiers becomes large in the drive circuit 200.

In order to make the layout surface area of the drive circuit 200 smaller, for example, MOS transistors of medium withstand voltage, having a lower withstand voltage than the MOS transistors of high withstand voltage, may be employed for the MOS transistors forming the output circuit of the first stage of each of the amplifiers. However, in such cases a voltage VDM, intermediate between the voltage VDD and the voltage VSS, is applied to the back gate of the MOS transistors of medium withstand voltage.

When such MOS transistors of medium withstand voltage are employed in this manner, the output voltages of the source amplifier 202 and the sink amplifier 204 sometimes fall outside voltage ranges. Namely, there are cases where the output voltage of the source amplifier 202 becomes less than the voltage VDM, and the output voltage of the sink amplifier 204 becomes the voltage VDM or greater.

This case will be explained with reference to FIG. 11A to FIG. 11D. FIG. 11A and FIG. 11B show examples of output patterns of the output terminal OUT1 and the output terminal OUT2. FIG. 11C and FIG. 11D show examples of output patterns of the source amplifier 202 and the sink amplifier 204. In FIG. 11A, an output pattern is shown when the source amplifier 202 outputs a voltage in the vicinity of the voltage VDD, and when the sink amplifier 204 outputs a voltage in the vicinity of the voltage VDM. In FIG. 11B, an output pattern is shown when the source amplifier 202 outputs a voltage in the vicinity of the voltage VDM, and when the sink amplifier 204 outputs a voltage in the vicinity of the voltage VSS.

When, as shown for example in FIG. 11A, the output voltage of the output terminal OUT1 outputting a voltage in the vicinity of the voltage VDD switches polarity from a positive polarity output range to a negative polarity output range, and also the output voltage of the output terminal OUT2 outputting a voltage in the vicinity of the voltage VDM switches polarity from a negative polarity output range to a positive polarity output range, the output signal voltage of each of the amplifiers is pulled to the negative charge side via the switch 206. Consequently, as shown in FIG. 11C, the output signal voltage SOAMP of the source amplifier 202 suddenly drops, and the output signal voltage SIAMP of the sink amplifier 204 also suddenly rises. Due thereto, as shown in FIG. 11C, a period of time 208 occurs when the output signal voltage SIAMP of the sink amplifier 204 exceeds the voltage VDM, which is the upper limit of the voltage range of the sink amplifier 204 (the SINK range).

However, as shown for example in FIG. 11B, as the output voltage of the output terminal OUT1 outputting a voltage in the vicinity of the voltage VDM switches polarity from a positive polarity output range to a negative polarity output range, and as the output voltage of the output terminal OUT2 outputting a voltage in the vicinity of the voltage VSS switches polarity from a negative polarity output range to a positive polarity output range, the output signal voltage of each of the amplifiers is pulled to the negative charge side via the switch 206. Consequently, as shown in FIG. 11D, the output signal voltage SOAMP of the source amplifier 202 suddenly drops, and the output signal voltage STAMP of the sink amplifier 204 also suddenly rises. Due thereto, as shown in FIG. 11D, a period of time 210 occurs when the output signal voltage SOAMP of the source amplifier 202 is less than the voltage VDM, this being the lower limit of the voltage range of the source amplifier 202 (SOURCE range).

When such a phenomenon occurs, latch-up is generated, and the circuits are damaged unless the power supply is interrupted.

INTRODUCTION TO THE INVENTION

The present disclosure provides a display panel driving apparatus that can achieve a smaller circuit layout surface area, and can also prevent damage to the circuits.

A first aspect of the present disclosure is a display panel driving apparatus including, a high voltage side operational amplifier that outputs a voltage between a highest voltage that is an upper limit to a specific power source range and a first intermediate voltage that is a voltage between the highest voltage and a lowest voltage that is the lowest limit of the specific power source range, the high voltage side operational amplifier including, a high voltage side difference circuit that outputs a signal based on a difference between a high voltage side driving signal for driving display cells of a display panel and a specific input signal, a first high voltage side output circuit that includes a first PMOS transistor and a first NMOS transistor connected in series and input with a signal output from the high voltage side difference circuit, the first PMOS transistor and the first NMOS transistor both having a first specific withstand voltage that is a withstand voltage of at least the difference between the highest voltage and the first intermediate voltage, a second high voltage side output circuit that includes a second PMOS transistor and a second NMOS transistor connected in series and input with a signal output from the first high voltage side output circuit, the second PMOS transistor and the second NMOS transistor both having a second specific withstand voltage that is a withstand voltage of at least the difference between the highest voltage and the lowest voltage, and a voltage-drop prevention MOS transistor, provided between the first high voltage side output circuit and the second high voltage side output circuit, that prevents a voltage of a specific portion of the first high voltage side output circuit from becoming lower than the first intermediate voltage; a low voltage side operational amplifier that outputs a voltage between the lowest voltage and a second intermediate voltage that is a voltage between the highest voltage and the lowest voltage, the low voltage side operational amplifier including, a low voltage side difference circuit that outputs a signal based on a difference between a low voltage side driving signal for driving the display cells and a specific input signal, a first low voltage side output circuit that includes a third PMOS transistor and a third NMOS transistor connected in series and input with a signal output from the low voltage side difference circuit, the third PMOS transistor and the third NMOS transistor both having a third specific withstand voltage that is a withstand voltage of at least the difference between the second intermediate voltage and the lowest voltage, a second low voltage side output circuit that includes a fourth PMOS transistor and a fourth NMOS transistor connected in series and input with a signal output from the first low voltage side output circuit, the fourth PMOS transistor and the fourth NMOS transistor both having the second specific withstand voltage, and a voltage-rise prevention MOS transistor, provided between the first low voltage side output circuit and the second low voltage side output circuit, that prevents a voltage of a specific portion of the first low voltage side output circuit from becoming higher than the second intermediate voltage; and a switching circuit that switches a signal output to the display cells between an output signal from the high voltage side operational amplifier and an output signal from the low voltage side operational amplifier, based on a specific polarity signal.

According to the first aspect of the present disclosure, the voltage-drop prevention MOS transistor is provided between the first high voltage side output circuit and the second high voltage side output circuit of the high voltage side operational amplifier. Together therewith, the first aspect also configures the first high voltage side output circuit with MOS transistors of the first specific withstand voltage (medium withstand voltage) and configures the second high voltage side output circuit with MOS transistors of the second specific withstand voltage (high withstand voltage). Further, in the first aspect the voltage-rise prevention MOS transistor is provided between the first low voltage side output circuit and the second low voltage side output circuit of the low voltage side operational amplifier. Together therewith, the first aspect also configures the first low voltage side output circuit with MOS transistors of the third specific withstand voltage (intermediate withstand voltage) and configures the second low voltage side output circuit with MOS transistors of the second specific withstand voltage (high withstand voltage).

Consequently, the first aspect of the present disclosure can prevent a specific location of the first high voltage side output circuit from becoming lower than the first intermediate voltage, can prevent a specific location of the first low voltage side output circuit from becoming higher than the second intermediate voltage, and can prevent circuit damage. The first aspect of the present disclosure can also make the circuit layout surface area smaller in comparison to a configuration in which the output circuits are all configured with high withstand voltage MOS transistors.

In a second aspect of the present disclosure, in the above-described first aspect, the voltage-drop prevention MOS transistor may be provided between a connection point of a drain of the first PMOS transistor and a drain of the first NMOS transistor, and a connection point of a drain of the second PMOS transistor and a drain of the second NMOS transistor.

In a third aspect of the present disclosure, in the above-described first aspect, the voltage-drop prevention MOS transistor may be provided between a gate of the first NMOS transistor and a gate of the second NMOS transistor.

In a fourth aspect of the present disclosure, in the above-described first aspect, the voltage-rise prevention MOS transistor may be provided between a connection point of a drain of the third PMOS transistor and a drain of the third NMOS transistor, and a connection point of a drain of the fourth PMOS transistor and a drain of the fourth NMOS transistor.

In a fifth aspect of the present disclosure, in the above-described first aspect, the voltage-rise prevention MOS transistor may be provided between a gate of the third NMOS transistor and a gate of the fourth NMOS transistor.

In a sixth aspect of the present disclosure, in the above-described first aspect, may further include a voltage applicator that, when the polarity signal is inverted, applies the first intermediate voltage to a gate of the voltage-drop prevention MOS transistor for a specific period and applies the second intermediate voltage to a gate of the voltage-rise prevention MOS transistor for the specific period.

In a seventh aspect of the present disclosure, in the above-described first aspect, the first intermediate voltage may be lower than the second intermediate voltage.

In a eighth aspect of the present disclosure, in the above-described first aspect, may further include a first level shifter, provided between the first PMOS transistor and the second PMOS transistor, and including a fifth PMOS transistor and a sixth PMOS transistor connected in series.

In a ninth aspect of the present disclosure, in the above-described first aspect, may further include a second level shifter, provided between the third NMOS transistor and the fourth NMOS transistor, and including a fifth NMOS transistor and a sixth NMOS transistor connected in series.

In a tenth aspect of the present disclosure, in the above-described first aspect, the first intermediate voltage may be applied to a back gate of the first NMOS transistor, and the lowest voltage may be applied to a back gate of the second NMOS transistor.

In a eleventh aspect of the present disclosure, in the above-described first aspect, the second intermediate voltage may be applied to a back gate of the third PMOS transistor, and the highest voltage may be applied to a back gate of the fourth PMOS transistor.

According to the display panel driving apparatus of the present disclosure, the circuit layout surface area can be made smaller, and circuit damage can be prevented.

BRIEF DESCRIPTION OF THE DRAWINGS

Exemplary embodiments of the present disclosure will be described in detail based on the following figures, wherein.

DETAILED DESCRIPTION

The exemplary embodiments of the present disclosure are described and illustrated below to encompass a display panel driving apparatus that can make the circuit layout surface area smaller, and prevent circuit damage. Of course, it will be apparent to those of ordinary skill in the art that the preferred embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

Figure 1:
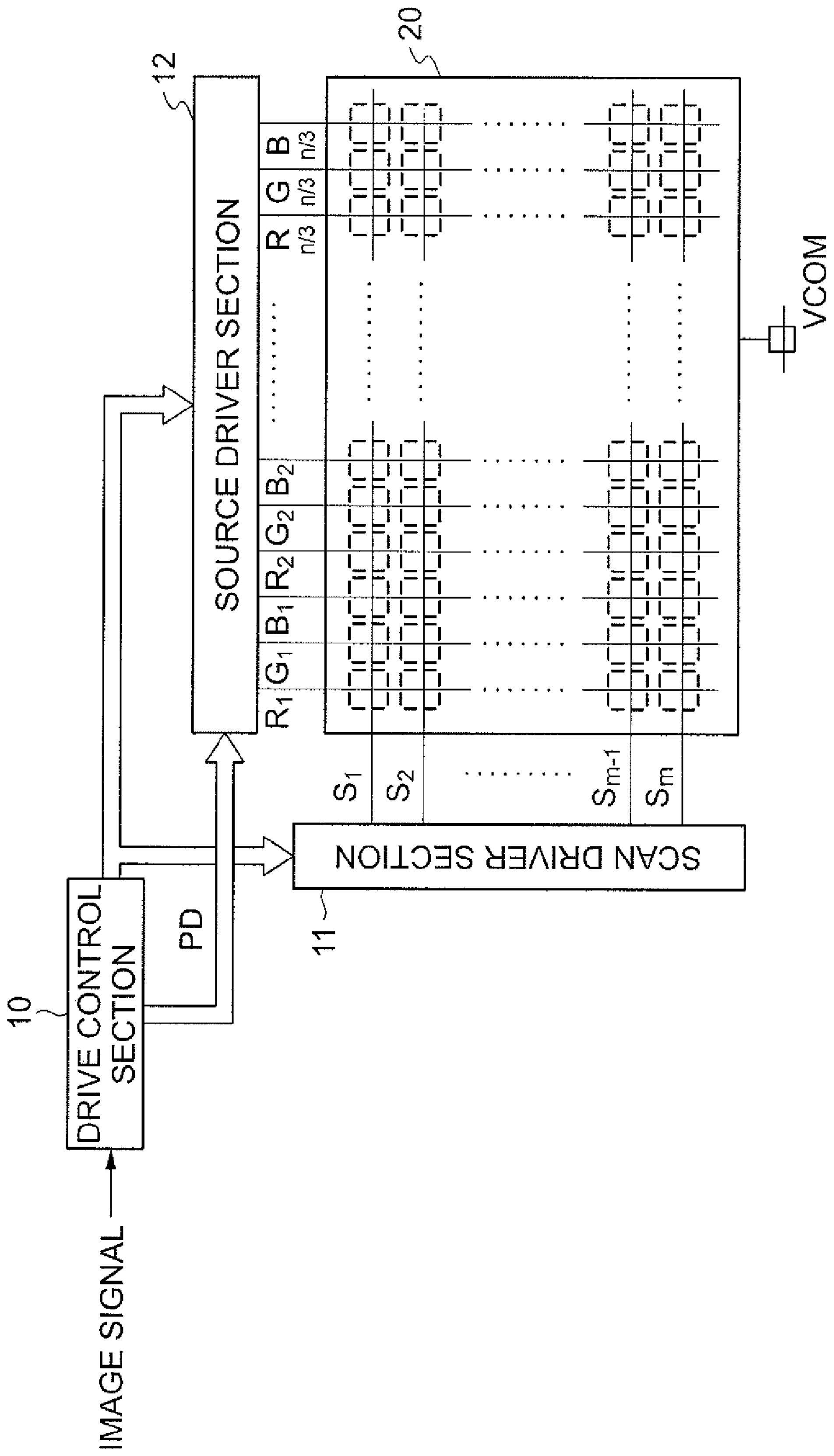
FIG. 1 is a figure showing a schematic configuration of a liquid crystal display device.

FIG. 1 is a figure showing a schematic configuration of a liquid crystal display device provided with a source driver as a display panel driving apparatus according to the present exemplary embodiment.

As shown in FIG. 1, the liquid crystal display device is configured from a drive control section 10, a scan driver section 11, a source driver section 12, and a display panel 20, as a color TFT (thin film transistor) liquid crystal panel.

The display panel 20 is configured with a liquid crystal layer (not shown in the drawings) to be driven, formed with m scan lines $S_1$ to $S_m$ that each respectively extend in a horizontal direction of a two-dimensional screen, and n source lines that each respectively extent in a vertical direction of a two-dimensional screen (red source lines $R_1$ to $R_{n/3}$, green source lines $G_1$ to $G_{n/3}$, and blue source lines $B_1$ to $B_{n/3}$). Display cells are also formed at regions of mutually intersecting portions of the scan lines and the source lines (regions shown surrounded by intermittent lines) and function as single pixels (a red pixel, a green pixel or a blue pixel). Each of the display cells includes a transistor (not shown in the drawings) that is switched to the ON state according to a scan pulse supplied from the scan driver section 11 via a scan line. These transistors, when in the ON state, apply a pixel drive potential, supplied from the source driver section 12 via a source line, to one of the electrodes from respective electrodes on either side of the liquid crystal layer (not shown in the drawings). A specific fixed reference potential VCOM is applied to the other of the respective electrodes on either side of the liquid crystal layer. Each of the display cells displays a brightness corresponding to the voltage arising due to the above pixel drive potential and reference potential VCOM.

The drive control section 10 generates, based on an input image signal, a frame synchronization signal that indicates a driving timing for each frame, and various drive control signals (described below). The drive control section 10 then supplies the generated drive control signal to the scan driver section 11 and to the source driver section 12. In addition, the drive control section 10, based on the input image signal, sequentially generates pixel data PD representing the brightness level of each of the pixels, for example in 8-bits, and supplies the pixel data PD 6-pieces at a time to the source driver section 12.

Namely, from the respective pixel data PD corresponding to each of the pixels on a single scan line, the drive control section 10 supplies pixel data PD for red pixels arrayed at odd numbered columns from the columns as a pixel data series $P_{R1}$, and for the even numbered columns thereof as pixel data series $P_{R2}$, to the source driver section 12. Also, from the pixel data PD corresponding to each of the pixels on a single scan line, the drive control section 10 supplies pixel data PD for green pixels arrayed at odd numbered columns from the columns as a pixel data series $P_{G1}$, and for the even numbered columns thereof as a pixel data series $P_{G2}$, to the source driver section 12. In addition, from the pixel data PD corresponding to each of the pixels on a single scan line, the drive control section 10 supplies pixel data PD for the blue pixels arrayed at odd numbered columns from the columns as a pixel data series $P_{B1}$, and for the even numbered columns thereof as a pixel data series $P_{B2}$, to the source driver section 12.

Figure 2:
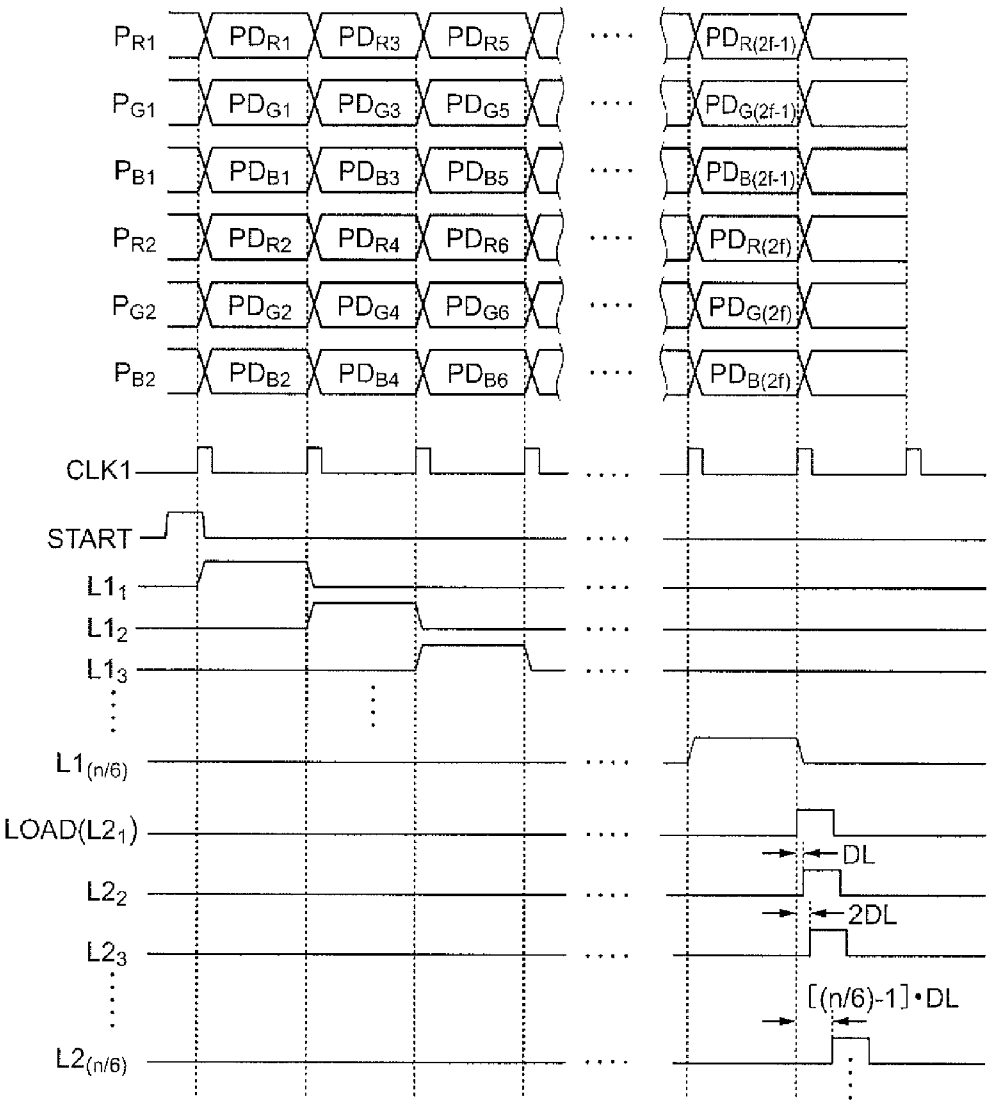
FIG. 2 is a figure showing an example of operation of a driving apparatus.

For example, as shown in FIG. 2, in accordance with the first clock pulse of clock signal CLK1, the drive control section 10 supplies the following pixel data, each at the same time, to the source driver section 12: $PD_{R1}$ as the first pixel data PD in the pixel data series $P_{R1}$; $PD_{G1}$ as the first pixel data PD in the pixel data series $P_{G1}$; $PD_{B1}$ as the first pixel data PD in the pixel data series $P_{B1}$; $PD_{R2}$ as the first pixel data PD in the pixel data series $P_{R2}$; $PD_{G2}$ as the first pixel data PD in the pixel data series $P_{G2}$; and $PD_{B2}$ as the first pixel data PD in the pixel data series $P_{B2}$.

Next, in accordance with the second clock pulse of clock signal CLK1, the drive control section 10 supplies the following pixel data, each at the same time, to the source driver section 12: $PD_{R3}$ as the second pixel data PD in the pixel data series $P_{R1}$; $PD_{G3}$ as the second pixel data PD in the pixel data series $P_{G1}$; $PD_{B3}$ as the second pixel data PD in the pixel data series $P_{B1}$; $PD_{R4}$ as the second pixel data PD in the pixel data series $P_{R2}$; $PD_{G4}$ as the second pixel data PD in the pixel data series $P_{G2}$; and $PD_{B4}$ as the second pixel data PD in the pixel data series $P_{B2}$.

Next, in accordance with the third clock pulse of clock signal CLK1, the drive control section 10 supplies the following pixel data, each at the same time, to the source driver section 12: $PD_{R5}$ as the third pixel data PD in the pixel data series $P_{R1}$; $PD_{G5}$ as the third pixel data PD in the pixel data series $P_{G1}$; $PD_{B5}$ as the third pixel data PD in the pixel data series $P_{B1}$; $PD_{R6}$ as the third pixel data PD in the pixel data series $P_{R2}$; $PD_{G6}$ as the third pixel data PD in the pixel data series $P_{G2}$; and $PD_{B6}$ as the third pixel data PD in the pixel data series $P_{B2}$.

The scan driver section 11, generates a scan pulse with a given peak voltage according to the frame synchronization signal supplied from the drive control section 10. The scan driver section 11 then applies this scan pulse to each of the scan lines $S_1$ to $S_m$ of the display panel 20 alternately in sequence.

The source driver section 12 imports the pixel data PD for each of the pixels from the six sets of pixel data series supplied from the drive control section 10 (namely from the pixel data series $P_{R1}$, $P_{G1}$, $P_{B1}$, $P_{R2}$, $P_{G2}$, and $P_{B2}$) and generates driving pulses, with a peak potential corresponding to the brightness level represented by this pixel data PD, one scan line's worth (n pieces worth) at a time. When this occurs, the source driver section 12 synchronizes with the scan pulse, and applies one scan line's worth (n pieces worth) of driving pulses, corresponding to each of the pixels belonging to the scan line to which the scan pulse is to be applied, to the corresponding respective source lines ($R_1$ to $R_{n/3}$, $G_1$ to $G_{n/3}$, $B_1$ to $B_{n/3}$).

Figure 3:
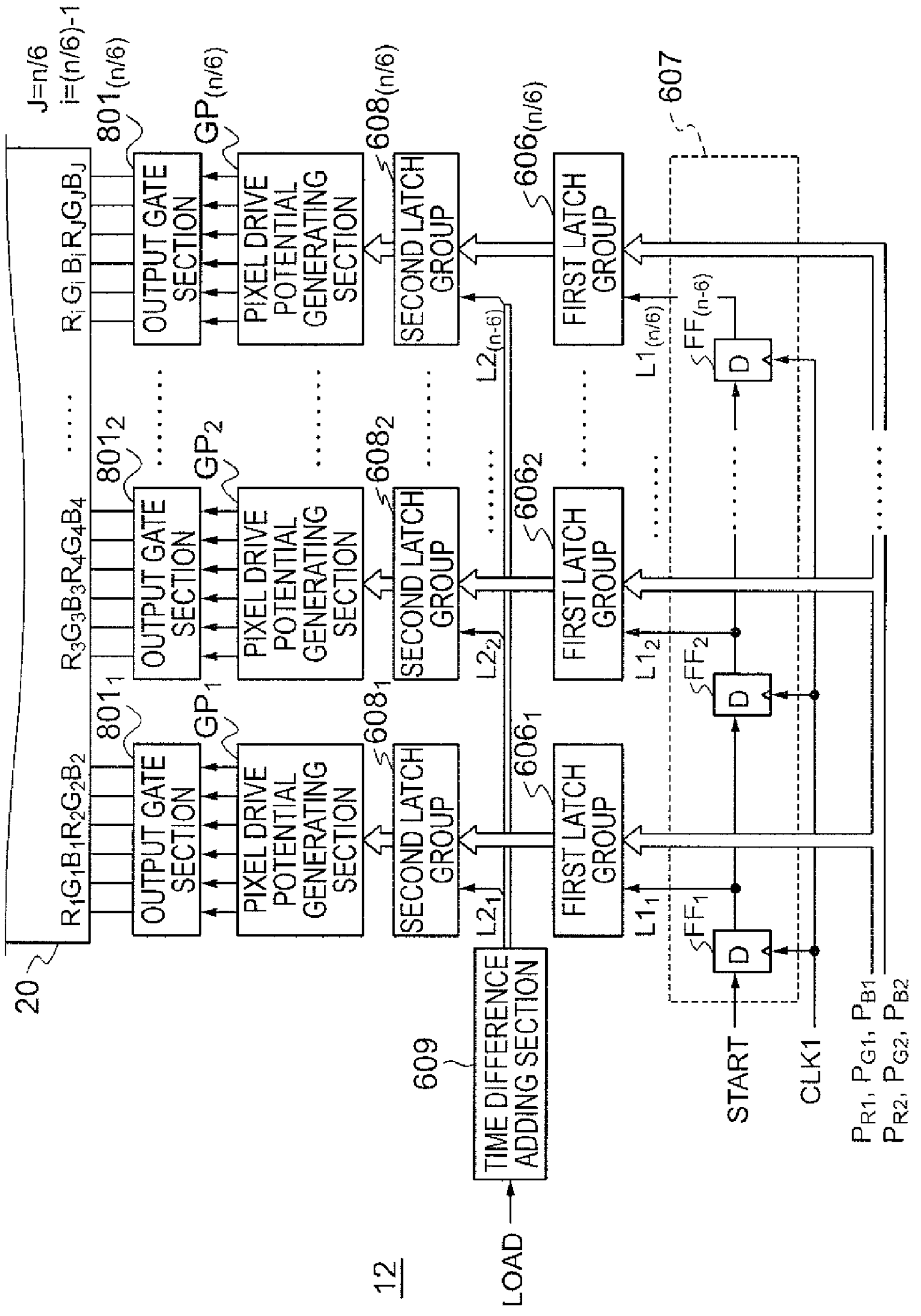
FIG. 3 is a figure showing a configuration of a source driver section 12.

FIG. 3 is a figure showing a schematic configuration of the source driver section 12.

As shown in FIG. 3, the source driver section 12 is configured from first latch groups 606$_1$ to 606$_{(n/6)}$, a shift register 607, second latch groups 608$_1$ to 608$_{(n/6)}$, a time difference adding section 609, pixel drive potential generating sections $GP_1$ to $GP_{(n/6)}$, and output gate sections 801$_1$ to 801$_{(n/6)}$.

Figure 4:
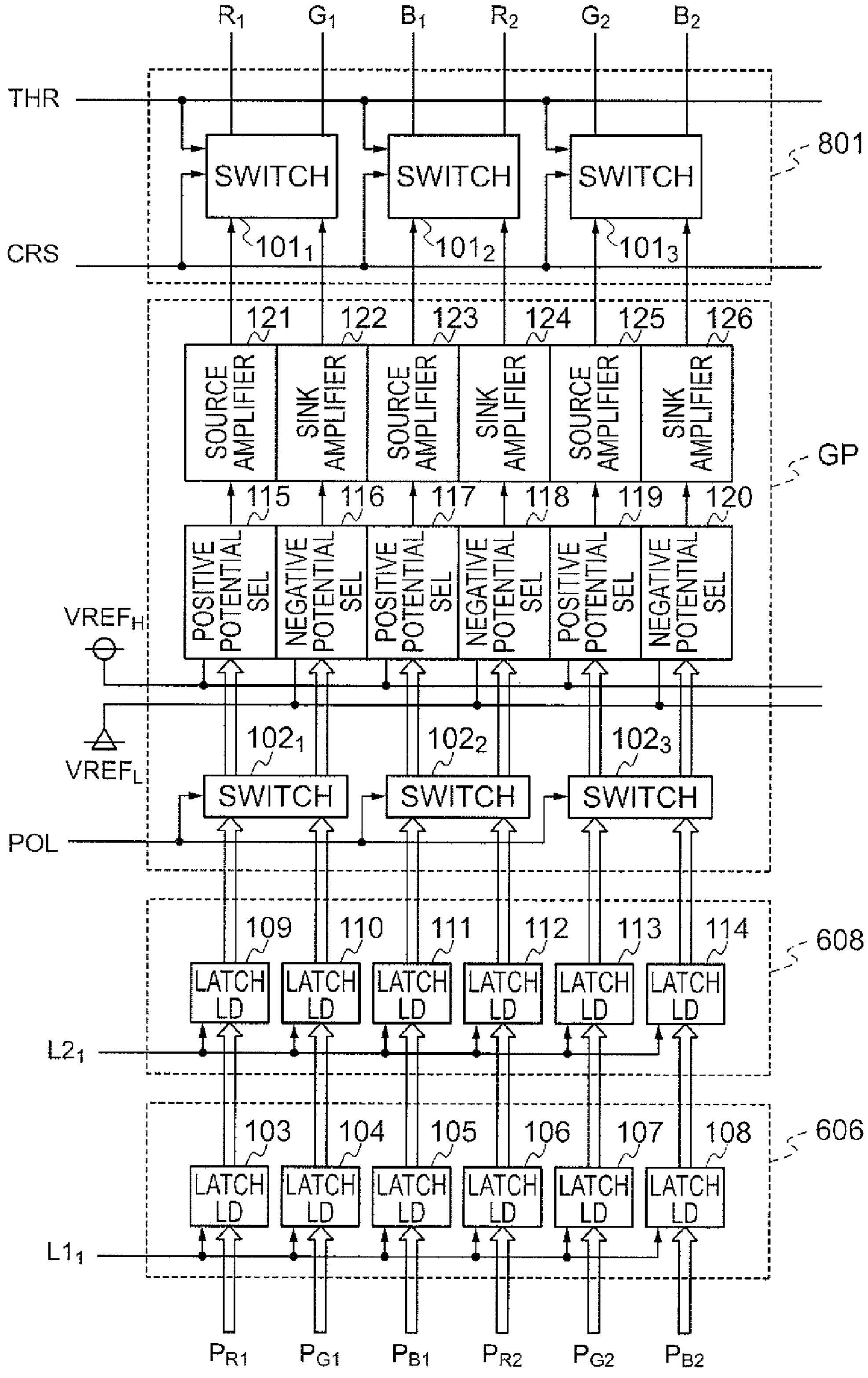
FIG. 4 is a figure showing an internal configuration of a first latch group, a second latch group, a pixel drive potential generating section, and an output gate section.

FIG. 4 is a diagram showing, from the configuration shown in FIG. 3, the internal configuration of each of the modules of the first latch group 606$_1$, the second latch group 608$_1$, the pixel drive potential generating section $GP_1$, and the output gate section 801$_1$.

The shift register 607 is configured from flip-flops $FF_1$ to $FF_{(n/6)}$ that, each time the drive control section 10 commences one scan line's worth of driving operation, shift a START signal for output, like that shown in FIG. 2, to the following stage in accordance with the clock signal CLK1. When this is performed, the output signals from each of the flip-flops $FF_1$ to $FF_{(n/6)}$ are supplied as first load signals L1$_1$ to L1$_{(n/6)}$, as shown in FIG. 2, to the corresponding first latch groups 606$_1$ to 606$_{(n/6)}$, respectively.

The first latch groups 606$_1$ to 606$_{(n/6)}$, where each are of similar internal configuration, are configured from latches 103 to 108 (as shown in FIG. 4). The latches 103 to 108 import and store pixel data PD from each of the respective pixel data series $P_{R1}$, $P_{G1}$, $P_{B1}$, $P_{R2}$, $P_{G2}$, $P_{B2}$ in accordance with the first load signal L1 supplied from the shift register 607, and output this data to the second latch groups 608.

For example, the latches 103 to 108 of the first latch group 606$_1$, in accordance with the first load signal L1$_1$ shown in FIG. 2, respectively import, store, and output the following pixel data to the second latch group 608$_1$, namely: the first pixel data $PD_{R1}$ in the pixel data series $P_{R1}$; the first pixel data $PD_{G1}$ in the pixel data series $P_{G1}$; the first pixel data $PD_{B1}$ in the pixel data series $P_{B1}$; the first pixel data $PD_{R2}$ in the pixel data series $P_{R2}$; the first pixel data $PD_{G2}$ in the pixel data series $P_{G2}$; and the first pixel data $PD_{B2}$ in the pixel data series $P_{B2}$.

Also, for example, the latches 103 to 108 of the first latch group 606$_2$, in accordance with the first load signal L1$_2$ shown in FIG. 2, respectively import, store, and output the following pixel data to the second latch group 608$_2$, namely: the second pixel data $PD_{R3}$ in the pixel data series $P_{R1}$; the second pixel data $PD_{G3}$ in the pixel data series $P_{G1}$; the second pixel data $PD_{B3}$ in the pixel data series $P_{B1}$; the second pixel data $PD_{R4}$ in the pixel data series $P_{R2}$; the second pixel data $PD_{G4}$ in the pixel data series $P_{G2}$; and the second pixel data $PD_{B4}$ in the pixel data series $P_{B2}$.

Furthermore, for example, the latches 103 to 108 of the first latch group 606$_3$, in accordance with the first load signal L1$_3$ shown in FIG. 2, respectively import, store, and output the following pixel data to the second latch group 608$_3$, namely: the third pixel data $PD_{R5}$ in the pixel data series $P_{R1}$, the third pixel data $PD_{G5}$ in the pixel data series $P_{G1}$, the third pixel data $PD_{B5}$ in the pixel data series $P_{B1}$, the third pixel data $PD_{R6}$ in the pixel data series $P_{R2}$, the third pixel data $PD_{G6}$ in the pixel data series $P_{G2}$, and the third pixel data $PD_{B6}$ in the pixel data series $P_{B2}$.

In continuation, each of the first latch groups 606$_4$ to 606$_{(n/6)}$ imports the pixel data PD in sequence according to the first load signals L1$_1$ to L1$_{(n/6)}$ shown in FIG. 2. Namely, one scan line's worth of pixel data PD is imported into each of the first latch groups 606$_1$ to 606$_{(n/6)}$. The drive control section 10 then supplies a load signal LOAD as shown in FIG. 2 to the time difference adding section 609.

Figure 5:
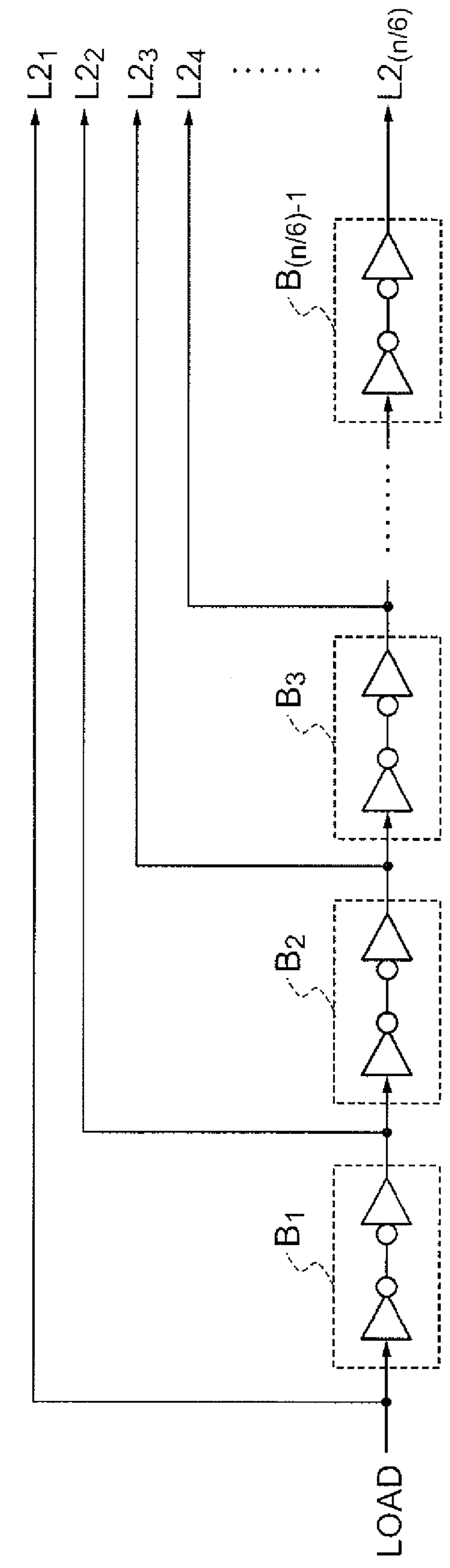
FIG. 5 is a figure showing an example of an internal configuration of a time difference adding section.

The time difference adding section 609, as shown in FIG. 2, supplies the above load signal LOAD unmodified as a second load signal $L2_1$ to the second latch group $608_1$. The time difference adding section 609 also outputs this load signal LOAD with different respective time differences as the second load signals $L2_2$ to $L2_{(n/6)}$ to the respective second latch groups $608_2$ to $608_{(n/6)}$. For example, the time difference adding section 609 is configured, as shown in FIG. 5, from buffers $B_1$ to $B_{(n/6)-1}$ that are each formed from two inverter elements connected together in series. The output of each of the buffers $B_1$ to $B_{(n/6)-1}$ are the above respective second load signals $L2_2$ to $L2_{(n/6)}$. When this is performed, each of the buffers $B_1$ to $B_{(n/6)}$ output the input signal after elapse of delay time DL, two inverter element's worth, and function as so-called delay elements. The second load signal $L2_2$ is thereby output with a delay of DL with respect to the second load signal $L2_1$. Also, the second load signal $L2_3$ is output with a delay of 2×DL with respect to the second load signal $L2_1$. Furthermore, the second load signal $L2_{(n/6)}$ is output with a delay of ((n/6)−1)×DL with respect to the second load signal $L2_1$.

Each of the second latch groups $608_1$ to $608_{(n/6)}$ are of similar internal configuration configured from latches 109 to 114 (namely, as shown in FIG. 4). The latches 109 to 114, in accordance with the second load signals L2, import and store pixel data PD supplied from the respective latches 103 to 108 of the previous stage first latch groups 606, and output this pixel data to the pixel drive potential generating sections GP.

For example, the latches 109 to 114 of the second latch group $608_1$, in accordance with the second load signal $L2_1$ like that shown in FIG. 2, import the respective pixel data PD supplied from each of the respective latches 103 to 108 of the first latch group $606_1$, with the same timing as the load signal LOAD, and store the pixel data PD. The latches 109 to 114 of the second latch group $608_1$ then output this pixel data PD to the pixel drive potential generating section $GP_1$.

Also, the latches 109 to 114 of the second latch group $608_2$, in accordance with the second load signal $L2_2$ as shown in FIG. 2, import the respective pixel data PD supplied from each of the respective latches 103 to 108 of the first latch group $606_2$, with a timing delayed by delay time DL with respect to the second load signal $L2_1$, and store the pixel data PD. The latches 109 to 114 then output this pixel data PD to the pixel drive potential generating section $GP_2$.

Also, the latches 109 to 114 of the second latch group $608_3$, in accordance with the second load signal $L2_3$ as shown in FIG. 2, import the respective pixel data PD supplied from each of the respective latches 103 to 108 of the first latch group $606_3$, with a timing delayed by 2×DL with respect to the second load signal $L2_1$, and store the pixel data PD. The latches 109 to 114 then output the pixel data PD to the pixel drive potential generating section $GP_3$.

In continuation, each of the first latch groups $608_4$ to $608_{(n/6)}$ import the pixel data PD, in sequence according to the second load signals $L2_4$ to $L2_{(n/6)}$ shown in FIG. 2.

In this manner, when all of one scan line's worth of pixel data PD has been imported into each of the first latch groups $606_1$ to $606_{(n/6)}$, the second latch groups $608_1$ to $608_{(n/6)}$ import the respective one scan line's worth of pixel data PD, in sequence of 6-pieces at a time, with a given time difference (DL), and output the pixel data PD. In other words, the timing at which the pixel data PD is imported by each of the respective second latch groups $608_1$ to $608_{(n/6)}$ is forcibly staggered by the time difference adding section 609. Thereby, in the second latch groups $608_1$ to $608_{(n/6)}$, there is no sudden power surge generated, even if many bit inversions are generated for the one scan line's worth of the data imported the previous time.

The pixel drive potential generating sections $GP_1$ to $GP_{(n/6)}$ each have a similar internal configuration. Namely, the pixel drive potential generating sections $GP_1$ to $GP_{(n/6)}$ include, as shown in FIG. 4, switches $102_1$ to $102_3$, positive potential selectors 115, 117, 119, negative potential selectors 116, 118, 120, source amplifiers 121, 123, 125, and sink amplifiers 122, 124, 126.

The switch $102_1$ ($102_2$, $102_3$), in accordance with a polarity signal POL supplied from the drive control section 10, supplies the pixel data PD supplied from the latch 109 (111, 113) or the latch 110 (112, 114) of the second latch groups 608 to one or the other of the positive potential selector 115 (117, 119) or the negative potential selector 116 (118, 120). For example, when the polarity signal POL is "H", the switch $102_1$ supplies the pixel data PD supplied from the latch 109 of the second latch groups 608 to the positive potential selector 115. The switch $102_1$ also supplies the pixel data PD supplied from the latch 110 of the second latch groups 608 to the negative potential selector 116. However, when the polarity signal POL is "L", the switch $102_1$ supplies the pixel data PD supplied from the latch 109 of the second latch groups 608 to the negative potential selector 116. The switch $102_1$ also supplies the pixel data PD supplied from the latch 110 of the second latch groups 608 to the positive potential selector 115.

The positive potential selector 115 (117, 119) selects a potential corresponding to the brightness level represented by the pixel data PD supplied from the switch $102_1$ ($102_2$, $102_3$). The potential is selected from respective potentials that are higher than the reference potential VCOM out of various potentials divided by a reference potential $VREF_H$ higher than the reference potential VCOM, and a reference potential $VREF_L$ lower than the reference potential VCOM. The positive potential selector 115 (117, 119) supplies this selected potential as a positive polarity brightness potential PV to the source amplifier 121 (123, 125).

The negative potential selector 116 (118, 120) selects an potential corresponding to the brightness level represented by the pixel data PD supplied from the switch $102_1$ ($102_2$, $102_3$). The potential is selected from respective potentials lower than the reference potential VCOM, out of various potentials divided by the reference potentials $VREF_H$ and $VREF_L$. The negative potential selector 116 (118, 120) then supplies this selected potential as a negative polarity brightness potential NV to the sink amplifier 122 (124, 126).

The source amplifier 121 (123, 125) amplifies the supplied positive polarity brightness potential PV to obtain an potential for driving the liquid crystal layer of the display panel 20. The source amplifier 121 (123, 125) then supplies the amplified potential as a pixel drive potential corresponding to each of the pixels to the switches ($101_1$ to $101_3$) of the output gate sections ($801_1$ to $801_{(n/6)}$.

The sink amplifier 122 (124, 126) amplifies the supplied negative polarity brightness potential NV to obtain an potential for driving the liquid crystal layer of the display panel 20. The sink amplifier 122 (124, 126) then supplies the amplified potential as a pixel drive potential corresponding to each of the pixels to the switches ($101_1$ to $101_3$) of the output gate sections ($801_1$ to $801_{(n/6)}$.

The switch $101_1$ ($101_2$ to $101_3$), in accordance with polarity signals THR, CRS supplied from the drive control section 10, outputs output signals of the source amplifiers (121, 123, 125) and sink amplifiers (122, 124, 126) to the respective source lines ($R_L$ to $R_{n/3}$, $G_1$ to $G_{n/3}$, $B_1$ to $B_{n/3}$). Specifically, for example, when the polarity signal THR is "H" and the polarity signal CRS is "L", the switch 101$_1$ (101$_2$, 101$_3$) outputs the output signal from the source amplifier 121 (123, 125) to the source line $R_1$ ($B_1$, $G_2$) and also outputs the output signal from the sink amplifier 122 (124, 126) to the source line $G_1$ ($R_2$, $B_2$). However, if the polarity signal THR is "L" and the polarity signal CRS is "H", the switch 101$_1$ (101$_2$, 101$_3$) outputs the output signal from the source amplifier 121 (123, 125) to the source line $G_1$ ($R_2$, $B_2$) and also outputs the output signal from the sink amplifier 122 (124, 126) to the source line $R_1$ ($B_1$, $G_2$).

In this manner, in the pixel drive potential generating sections GP, based on the input image signal, the brightness level of each of the pixels is converted into the negative polarity brightness potential NV, or the positive polarity brightness potential PV, corresponding to that brightness level. In addition, in the pixel drive potential generating sections GP the converted potentials are generated, as a pixel drive potential to be applied to each of the pixels via the source lines ($R_1$ to $R_{n/3}$, $G_1$ to $G_{n/3}$, $B_1$ to $B_{n/3}$) of the control section 20. When this is performed, for any adjacent pixels, if the pixel drive potential corresponding to one thereof is a negative polarity brightness potential NV, then the pixel drive potential generating sections GP use a positive polarity brightness potential PV for the pixel drive potential corresponding to the other thereof.

For example, when the polarity signal POL is "H", the pixel data PD output from the latch 109 of the second latch groups 608 is supplied to the positive potential selector 115 via the switch 102$_1$. Then, the positive polarity brightness potential PV obtained using the positive potential selector 115 is output to the source amplifier 121. Also, when the polarity signal POL is "H", the pixel data PD output from the latch 110 of the second latch groups 608 is supplied to the negative potential selector 116 via the switch 102$_1$. Then, the negative polarity brightness potential NV obtained using the negative potential selector 116 is output to the sink amplifier 122. Namely, in this case, a positive polarity brightness potential PV is output from the source amplifier 121. A pixel drive potential corresponding to a negative polarity brightness potential NV is output from the sink amplifier 122, corresponding to the adjacent pixel to the pixel that corresponds to the source amplifier 121.

However, when the polarity signal POL is "L", the pixel data PD output from the latch 109 of the second latch groups 608 is supplied to the negative potential selector 116 via the switch 102$_1$. Then the negative polarity brightness potential NV obtained using the negative potential selector 116 is output to the source amplifier 121 through the switch 101$_1$. Also, when the polarity signal POL is "L", the pixel data PD output from the latch 110 of the second latch groups 608 is supplied to the positive potential selector 115 via the switch 102$_1$. Then the positive polarity brightness potential PV obtained using the positive potential selector 115 is output to the sink amplifier 122. Namely, in this case, a negative polarity brightness potential NV is output from the source amplifier 121. A pixel drive potential corresponding to a positive polarity brightness potential PV is output from the sink amplifier 122. When the above pixel drive potentials are applied to one of the electrodes on either side of the liquid crystal layer of the display panel 20, the fixed reference potential VCOM, which is higher than the negative polarity brightness potential NV and lower than the positive polarity brightness potential PV, is supplied to the other of the electrodes. Consequently, when a positive polarity brightness potential PV is applied as the pixel drive potential, the liquid crystal layer of the display panel 20 is applied with a driving voltage of positive polarity. However, when a negative polarity brightness potential NV is applied as the pixel drive potential, the liquid crystal layer of the display panel 20 is applied with a driving voltage of negative polarity.

In other words, the pixel drive potential generating sections GP generate a pixel drive potential to be applied to each of the pixels via the source lines ($R_1$ to $R_{n/3}$, $G_1$ to $G_{n/3}$, $B_1$ to $B_{n/3}$) of the display panel 20. When this is performed, the pixel drive potential generating sections GP invert the polarity for each of the adjacent pixels, and also this inverted state can be changed in accordance with polarity signals THR, CRS.

Each of the generated pixel drive potentials, corresponding to the respective pixels of one scan line's worth of pixels, is supplied to the respective switch 101$_1$, 101$_2$, 101$_3$ of the respective output gate sections 801$_1$ to 801$_{(n/6)}$.

The second latch groups 608$_1$ to 608$_{(n/6)}$ import the pixel data PD with different respective time differences according to the second load signals $L2_1$ to $L2_{(n/6)}$. Therefore, the output timing for the respective pixel drive potentials output from each of the pixel drive potential generating sections $GP_1$ to $GP_{(n/6)}$ is staggered by these time differences. Consequently, when the pixel drive potentials output from the pixel drive potential generating sections $GP_1$ to $GP_{(n/6)}$ are applied to the display panel 20 that includes a capacitance, such as a liquid crystal display panel, the charging load for each of the pixels would be uneven in accordance with the above staggered output timing. Consequently, this might lead to deterioration in image quality.

The source driver section 12 shown in FIG. 3 and FIG. 4 sets each of the respective output gate sections 801$_1$ to 801$_{(n/6)}$ all at once to the ON state only after all of the pixel drive potentials have been output from the respective pixel drive potential generating section $GP_1$ to $GP_{(n/6)}$. Therefore, the source driver section 12 applies these respective pixel drive potentials all at the same time to the respective source lines ($R_1$ to $R_{n/3}$, $G_1$ to $G_{n/3}$, $B_1$ to $B_{n/3}$) of the display panel 20.

Consequently, even though, in order to suppress a large instantaneous surge in charge, the source driver section 12 forcibly makes the timing for importing the pixel data of the respective second latch groups 608$_1$ to 608$_{(n/6)}$ different from each other, the charging load amount due to application of one scan line's worth of the respective pixel drive potentials is uniform for each of the respective pixels. Consequently, in the display panel driving apparatus according to the present exemplary embodiment, there is no deterioration in image quality such as that described above.

Explanation will now be given of a specific configuration of the source amplifiers (121, 123, 125) and sink amplifiers (122, 124, 126).

First explanation will be given of a specific configuration of the source amplifiers (121, 123, 125). Since each of the source amplifiers are of a similar configuration, explanation will only be given regarding the source amplifier 121.

Figure 6:
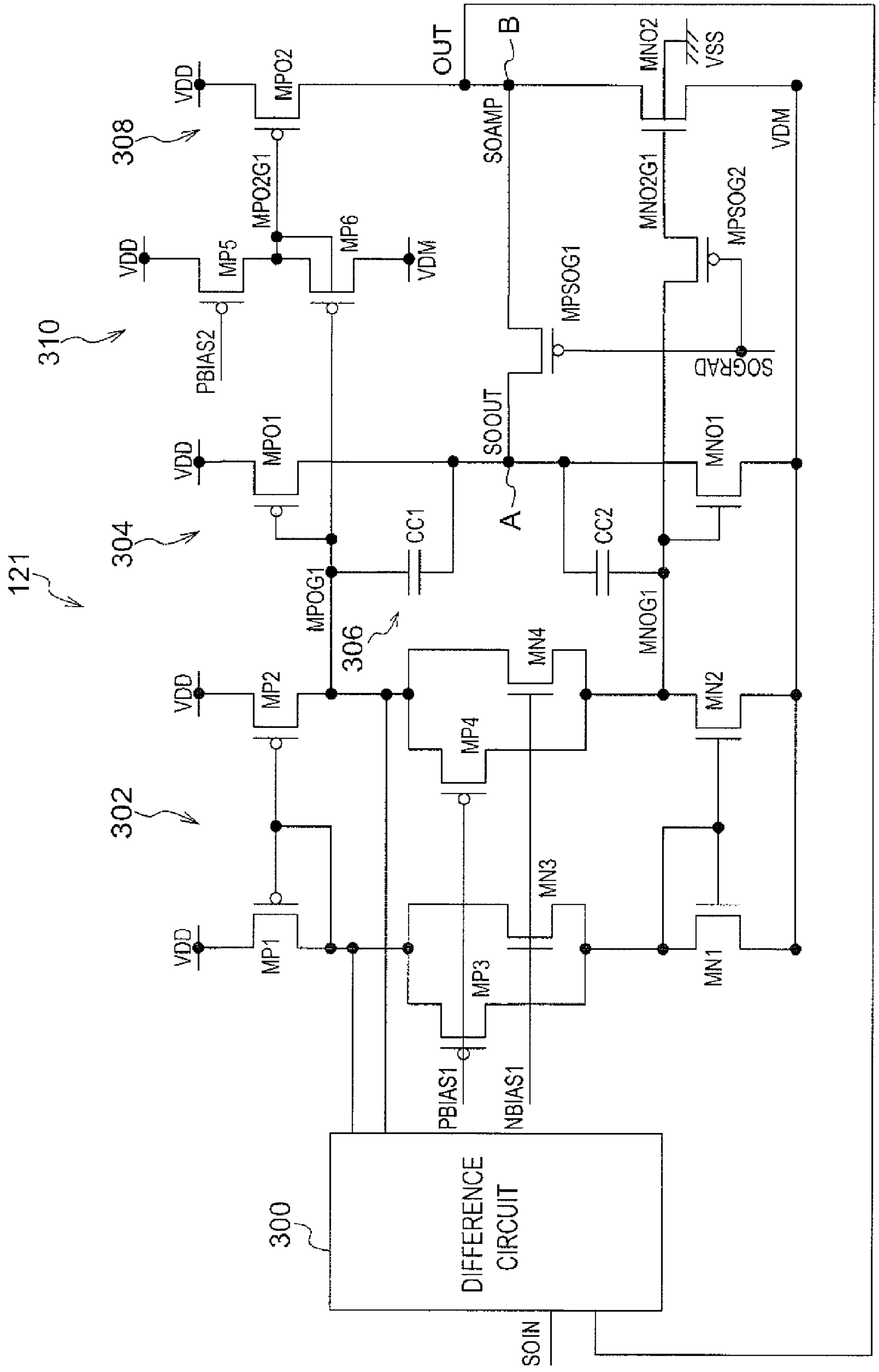
FIG. 6 is a circuit diagram of a source amplifier.

As shown in FIG. 6, the source amplifier 121 includes a difference circuit 300, a current mirror circuit 302, a first output circuit 304, a phase compensation circuit 306, a second output circuit 308, a level shifter 310, and guard transistors MPSOG1, MPSOG2.

The positive polarity brightness potential PV (high voltage side driving signal) output from the positive potential selector 115 is input to one of the input terminals of the difference circuit 300 as the input signal SOIN. The output signal voltage SOAMP output from the output terminal OUT of the source amplifier 121 is input to the other input terminal of the difference circuit 300. The difference circuit 300 outputs a signal to the current mirror circuit 302, based on the difference between these signals. In this manner, the output terminal of the source amplifier 121 is connected to the other input terminal of the difference circuit 300. Thereby, the source amplifier 121 functions as a so-called voltage follower.

The current mirror circuit 302 includes PMOS transistors MP1, MP2, MP3, MP4, and NMOS transistors MN1, MN2, MN3, MN4. A specific bias voltage PBIAS1 is applied to the gates of the PMOS transistors MP3, MP4. A specific bias voltage NBIAS1 is applied to the gates of the NMOS transistors MN3, MN4. Note that the current mirror circuit 302 is of a circuit configuration of an ordinary current mirror circuit, and so explanation of the configuration and operation thereof will be omitted.

The first output circuit 304 is configured with a PMOS transistor MPO1 and an NMOS transistor MNO1 connected in series. "Connected in series" here means that the drain of the PMOS transistor MPO1 and the drain of the NMOS transistor MNO1 are connected together in series.

The phase compensation circuit 306 is configured with condensers CC1, CC2. One terminal of the condenser CC1 is connected to a connection point MPOG1, of the gate of the PMOS transistor MPO1 and to the drain of the PMOS transistor MP2. The other terminal of the condenser CC1 is connected to the drain of the PMOS transistor MPO1. One terminal of the condenser CC2 is connected to a connection point MNOG1, of the gate of the NMOS transistor MNO1 and to the drain of the NMOS transistor MN2. The other terminal of the condenser CC2 is connected to the drain of the NMOS transistor MNO1.

The second output circuit 308 is configured with a PMOS transistor MPO2 and an NMOS transistor MNO2 connected in series.

The level shifter 310 is configured with a PMOS transistor MP5 and a PMOS transistor MP6. A specific bias voltage PBIAS2 is applied to the gate of the PMOS transistor MP5. The gate of the PMOS transistor MP6 is connected to the connection point MPOG1. Further, the back gate of the PMOS transistor MP6 is connected to the gate of the PMOS transistor MPO2.

The guard transistor MPSOG1 is configured from a PMOS transistor. The guard transistor MPSOG1 is provided between a connection point A of the PMOS transistor MPO1 and the NMOS transistor MNO1, and a connection point B of the drain of the PMOS transistor MPO2 and the drain of the NMOS transistor MNO2.

The guard transistor MPSOG2 is configured from a PMOS transistor. The guard transistor MPSOG2 is provided between the connection point MNOG1 and the gate of the NMOS transistor MNO2.

A control signal voltage SOGRAD, described later, is applied to the gates of the guard transistors MPSOG1, MPSOG2 from the drive control section 10.

The voltage VDD, which is the upper limit of the power source range, is applied to the sources of the PMOS transistors MP1, MP2, MPO1, MP5 and MPO2. The voltage VDM, this being an intermediate voltage between the voltage VDD and the voltage VSS, which is the lower limit of the power source range (for example ½ the difference between VDD and VSS in the present exemplary embodiment), is applied to the source of the NMOS transistors MN1, MN2, MNO1, MNO2.

The PMOS transistor MPO2, the NMOS transistor MNO2, and the guard transistors MPSOG1, MPSOG2 of the second output circuit 308 are configured from high withstand voltage transistors with a withstand voltage (first specific withstand voltage) that is at least the voltage VDD. The other PMOS transistors and NMOS transistors are configured by medium withstand voltage transistors with a withstand voltage (second specific withstand voltage) that is at least the difference between the intermediate voltage VDM and the voltage VDD, this being a lower withstand voltage than the high withstand voltage transistors.

Whilst not shown in the drawings, the voltage VDD is applied to the back gates of the PMOS transistor MPO2, and the guard transistors MPSOG1, MPSOG2, these being PMOS transistors. In addition, the voltage VSS like that shown in FIG. 6 (ground in the present exemplary embodiment) is applied to the back gates of the NMOS transistor MNO2.

The voltage VDD is applied to the back gate of other PMOS transistors without specific annotation in FIG. 6. Further, the voltage VDM is applied to the back gates of other NMOS transistors without specific annotation in FIG. 6.

The first output circuit 304 is configured in this manner from MOS transistors of medium withstand voltage. Further, the second output circuit 308 is configured from MOS transistors of high withstand voltage. Consequently, the circuit layout surface area in the present exemplary embodiment can be made smaller in comparison to cases where the first output circuit 304 and the second output circuit 308 are both configured from MOS transistors of high withstand voltage.

Explanation will now be given of a specific configuration of the sink amplifiers (122, 124, 126). Note that since each of the sink amplifiers are of a similar configuration, explanation will only be given of the sink amplifier 122.

Figure 7:
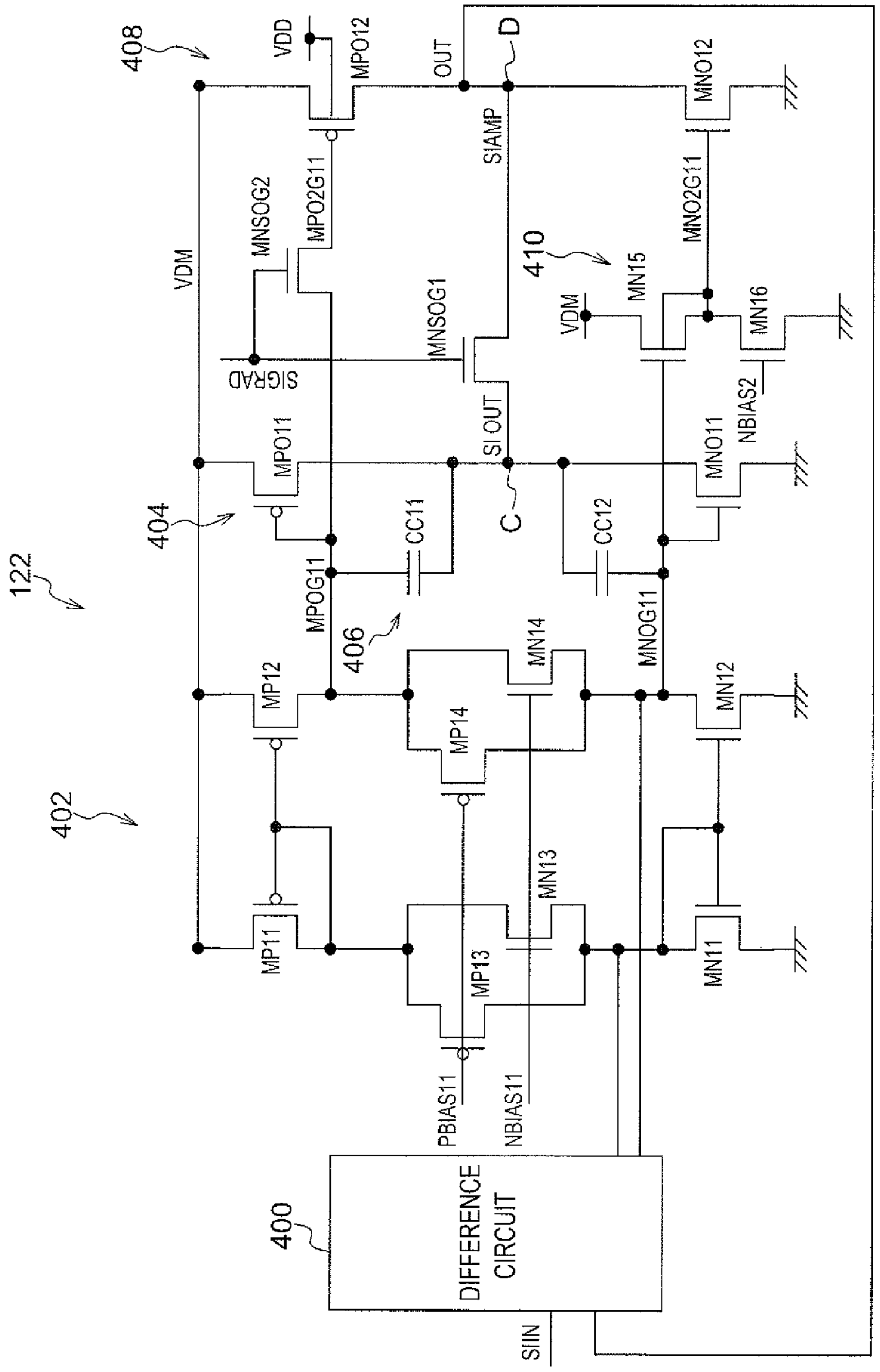
FIG. 7 is circuit diagram of a sink amplifier.

As shown in FIG. 7, the sink amplifier 122 includes a difference circuit 400, a current mirror circuit 402, a first output circuit 404, a phase compensation circuit 406, a second output circuit 408, level shifter 410, and guard transistors MNSOG1, MNSOG2.

A negative polarity brightness potential NV (low voltage side driving signal) output from the negative potential selector 116 is input to one of the input terminals of the difference circuit 400 as the input signal SIIN. The output signal voltage STAMP output from the output terminal OUT of the sink amplifier 122 is input to the other input terminal of the difference circuit 400. The difference circuit 400 outputs a signal to the current mirror circuit 402, based on the difference between these signals. In this manner, the output terminal of the sink amplifier 122 is connected to the other input terminal of the difference circuit 400. Thereby, the sink amplifier 122 functions as a so-called voltage follower.

The current mirror circuit 402 includes PMOS transistors MP11, MP12, MP13, MP14, and NMOS transistors MN11, MN12, MN13, MN14. A specific bias voltage PBIAS11 is applied to the gates of the PMOS transistors MP13, MP14. A specific bias voltage NBIAS11 is applied to the gates of the NMOS transistors MN13, MN14.

The first output circuit 404 is configured with a PMOS transistor MPO11 and an NMOS transistor MNO11 connected in series.

The phase compensation circuit 406 is configured with condensers CC11, CC12. One terminal of the condenser CC11 is connected to a connection point MPOG11, of the gate of the PMOS transistor MPO11 and the drain of the PMOS transistor MP12. The other terminal of the condenser CC11 is connected to the drain of the PMOS transistor MPO11. One terminal of the condenser CC12 is connected to a connection point MNOG11, of the gate of the NMOS transistor MNO11 and to the drain of the NMOS transistor MN12. The other terminal of the condenser CC12 is connected to the drain of the NMOS transistor MNO11.

The second output circuit 408 is configured with a PMOS transistor MPO12 and an NMOS transistor MNO12 connected in series.

The level shifter 410 is configured from a NMOS transistor MN15 and an NMOS transistor MN16 connected in series. The specific bias voltage PBIAS2 is applied to the gate of the NMOS transistor MN16. The gate of the NMOS transistor MN15 is connected to the connection point MNOG11. The back gate of the NMOS transistor MN15 is also connected to the gate of the NMOS transistor MNO12.

The guard transistor MPSOG1 is configured from an NMOS transistor. The guard transistor MPSOG1 is provided between a connection point C of the PMOS transistor MPO11 and the NMOS transistor MNO11, and a connection point D of the drain of the PMOS transistor MPO12 and the drain of the NMOS transistor MNO12.

The guard transistor MPSOG2 is configured from a NMOS transistor, and is provided between the connection point MPOG11 and the gate of the PMOS transistor MPO12.

A control signal voltage SIGRAD, described later, is applied to the gates of the guard transistors MPSOG1, MPSOG2 from the drive control section 10.

The voltage VDM is applied to the sources of the PMOS transistors MP11, MP12, MPO11, and MPO12. The voltage VSS is applied to the source of the NMOS transistors MN11, MN12, MNO11, MNO16, MNO12.

The PMOS transistor MPO12, the NMOS transistor MNO12, and the guard transistors MPSOG1, MPSOG2 of the second output circuit 408 are configured from high withstand voltage transistors. The other PMOS transistors and NMOS transistors are configured by medium withstand voltage transistors with a withstand voltage (third specific withstand voltage) that is at least the difference between the intermediate voltage VDM and the voltage VSS, this being a lower withstand voltage than the high withstand voltage transistors.

Whilst not shown in the drawings, the voltage VSS is applied to the back gates of the NMOS transistor MNO12 and the guard transistors MPSOG1, MPSOG2, these being NMOS transistors. In addition, the voltage VDD like that shown in FIG. 7 is applied to the back gates of the PMOS transistor MPO12.

The voltage VDM is applied to the back gate of other PMOS transistors without specific annotation in FIG. 7. Further, the voltage VSS is applied to the back gates of other NMOS transistors without specific annotation in FIG. 7.

The first output circuit 404 is configured in this manner from MOS transistors of medium withstand voltage. Further, the second output circuit 408 is configured from MOS transistors of high withstand voltage. Consequently, the circuit layout surface area in the present exemplary embodiment can be made smaller in comparison to cases where the first output circuit 404 and the second output circuit 408 are both configured from MOS transistors of high withstand voltage.

Figure 8:
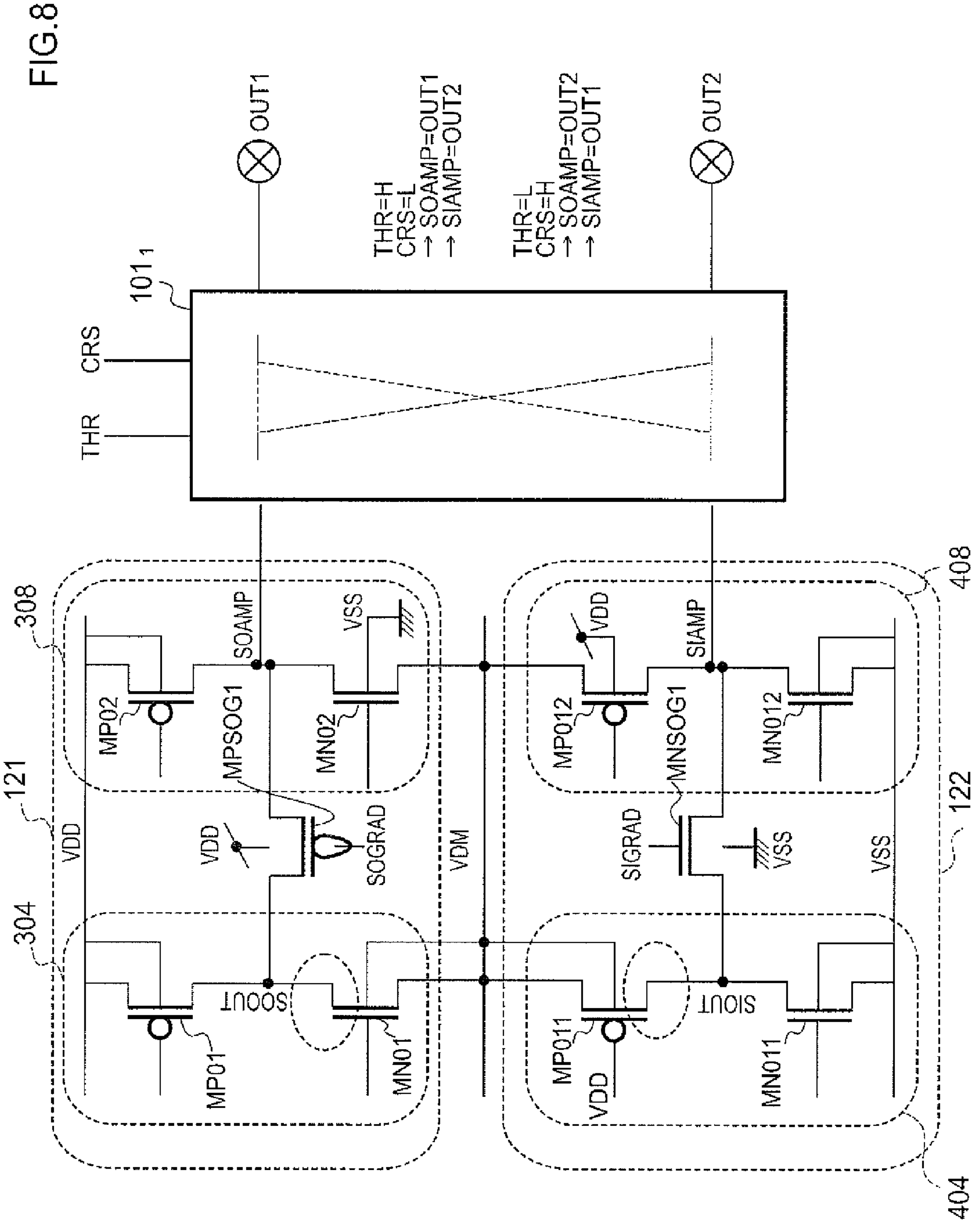
FIG. 8 is a figure showing a schematic configuration of a source amplifier, a sink amplifier, and a switch.

The output signal voltage SOAMP of the source amplifier 121 and the output signal voltage SIAMP of the sink amplifier 122 each output to the switch $101_1$, as shown in FIG. 8. Note that the source amplifier 121 and the sink amplifier 122 are shown as simplified versions in FIG. 8.

As stated above, when the polarity signal THR supplied from the drive control section 10 is H and the polarity signal CRS supplied from the drive control section 10 is L, the switch $101_1$ outputs the output signal voltage SOAMP from the source amplifier 121 (123, 125) to the output terminal OUT1 (source line $R_1$ in the present exemplary embodiment). Together with this, the switch $101_1$ also outputs the output signal voltage SIAMP from the sink amplifier 122 to the output terminal OUT2 (source line $G_1$ in the present exemplary embodiment). When, however, the polarity signal THR is L and the polarity signal CRS is H, the switch $101_1$ outputs the output signal from the source amplifier 121 to the output terminal OUT2. Together with this, the switch $101_1$ also outputs the output signal from the sink amplifier 122 to the output terminal OUT1.

Explanation will now be given of the output signals from the source amplifier 121, the sink amplifier 122, and the switch $101_1$ when polarity is being switched over.

Figure 9:
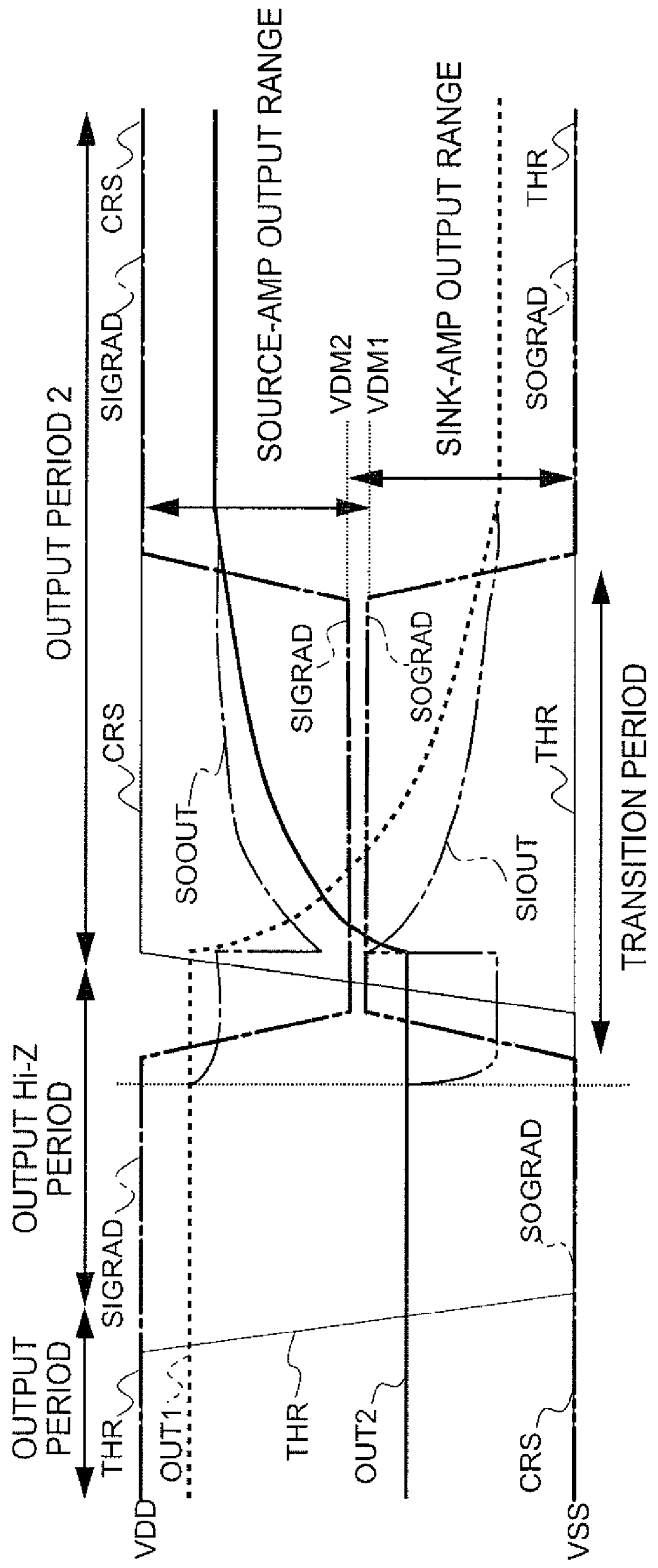
FIG. 9 is a figure showing waveforms of output signals from each source amplifier, sink amplifier, and switch section, when a polarity signal switches the polarity.
Figure 10:
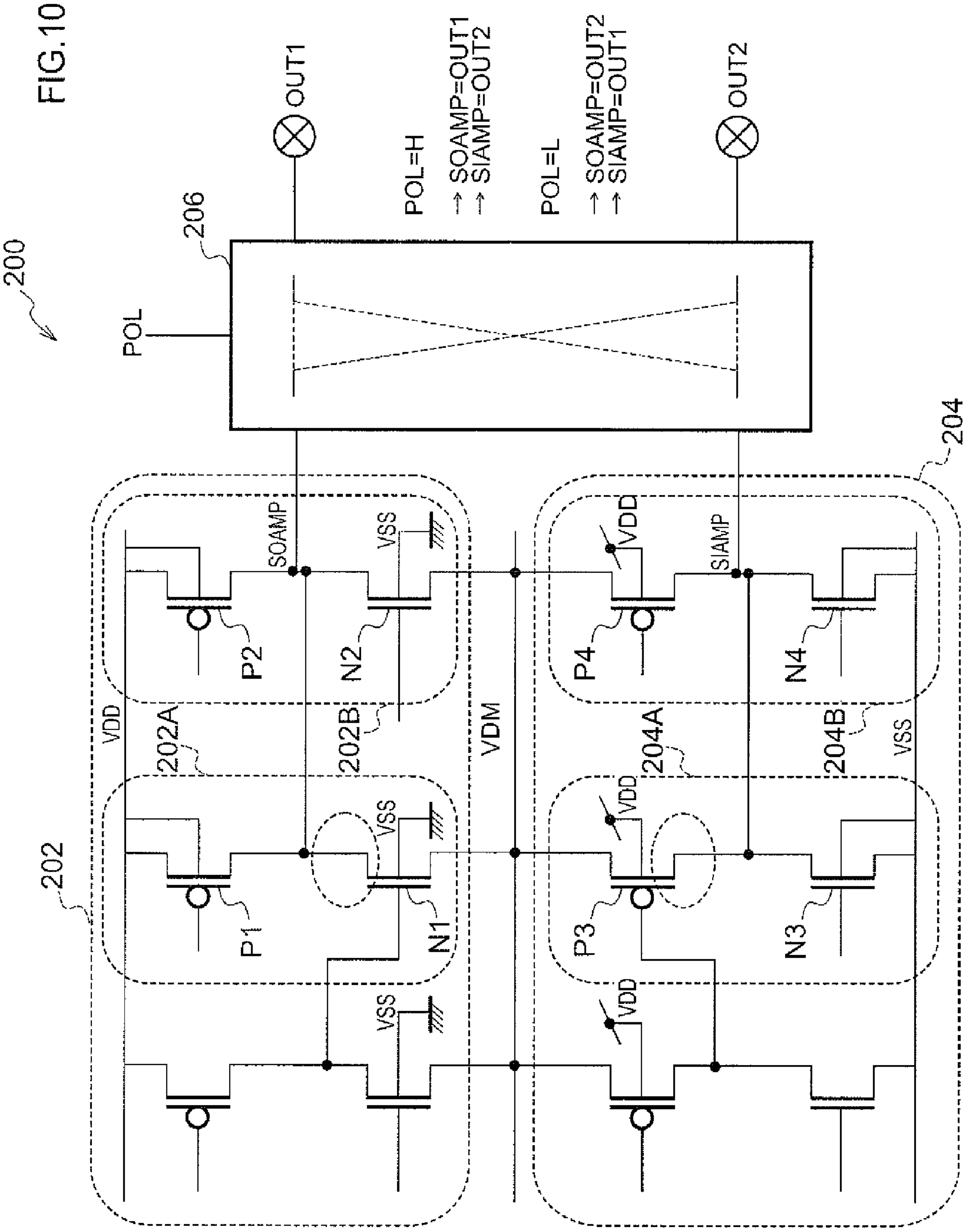
FIG. 10 is a figure showing a related art schematic configuration of a source amplifier, a sink amplifier, and a switch.
Figure 11A:
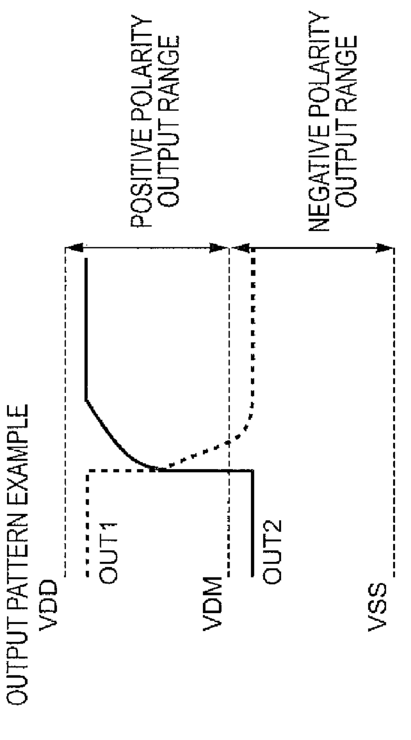
FIG. 11A and FIG. 11B are figures showing waveforms of an example of output patterns of a switch.
Figure 11B:
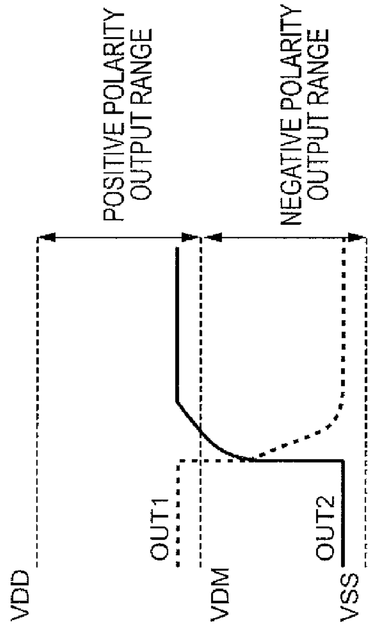
Figure 11C:
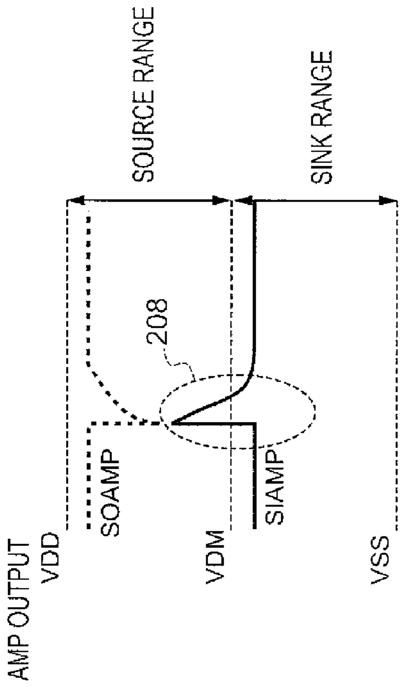
FIG. 11C and FIG. 11D are figures showing waveforms of an example of output signal of a source amplifier and a sink amplifier.
Figure 11D:
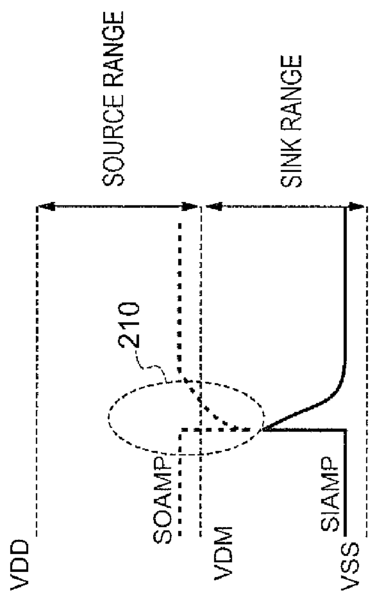

FIG. 9 shows the following waveforms when switching over polarity of the polarity signals THR, CRS: an output signal voltage SOOUT of the first output circuit 304 of the source amplifier 121 (see FIG. 6), an output signal voltage SIOUT of the first output circuit 404 of the sink amplifier 122 (see FIG. 7), an output signal voltage from the output terminal OUT1 of the switch $101_1$ (referred to below as the output signal voltage OUT1), an output signal voltage from the output terminal OUT2 (referred to below as the output signal voltage OUT2), the control signal voltage SOGRAD that the drive control section 10 supplies to the gates of the guard transistors MPSOG1, MPSOG2 of the source amplifier 121, and the control signal voltage SIGRAD the drive control section 10 supplies to the gates of the guard transistors MPSOG1, MPSOG2 of the sink amplifier 122.

As shown here in FIG. 9, the output range of the source amplifier 121 is a range from intermediate voltage VDM1 (first intermediate voltage), this being is a voltage intermediate between the voltage VDD and the voltage VSS, up to the voltage VDD. The output range of the sink amplifier 122 is a range from the voltage VSS up to an intermediate voltage VDM2 (second intermediate voltage), this being a voltage intermediate between the voltage VDD and the voltage VSS. The voltage VDM1 is lower than the voltage VDM2. Namely, the source amplifier 121 and the sink amplifier 122 are configured such that portions of the output ranges thereof mutually overlap. Thereby, in the display panel driving apparatus according to the present exemplary embodiment, normal operation is achieved even if the intermediate voltage VDM shown in FIG. 6 and FIG. 7 (in the present exemplary embodiment 112 VDD) are slightly displaced from each other. This is particularly effective, for example, in applications employing separate power source chips to supply power to the source amplifier 121 and the sink amplifier 122, where there are slight differences in the intermediate voltages supplied to the source amplifier 121 and the sink amplifier 122.

The drive control section 10, as shown in FIG. 9, outputs in an output period 1, as an example, "H" as polarity signal THR (voltage VDD) and "L" as polarity signal CRS (voltage VSS) to the switch $101_1$.

In the output period 1, the drive control section 10 also applies the voltage VSS as the control signal voltage SOGRAD to the gates of the guard transistors MPSOG1, MPSOG2 of the source amplifier 121. Together with this, in the output period 1 the drive control section 10 also applies the voltage VDD as the control signal voltage SIGRAD to the gates of the guard transistors MNSOG1, MNSOG2 of the sink amplifier 122.

Accordingly, the guard transistors MPSOG1, MPSOG2 of the source amplifier 121 and the guard transistors MNSOG1, MNSOG2 of the sink amplifier 122 all adopt the ON state. Consequently the output signal voltage SOOUT of the first output circuit 304 of the source amplifier 121 is output unmodified as the output signal voltage SOAMP to the output terminal OUT1 of the switch $101_1$. The output signal voltage SIOUT of the first output circuit 404 of the sink amplifier 122 is also output unmodified as the output signal voltage SIAMP to the output terminal OUT2 of the switch $101_1$.

Then, the drive control section 10 switches the polarity signal THR to "L". The output terminals OUT1, OUT2 of the switch $101_1$ thereby become of high impedance.

The drive control section 10 then, as shown in FIG. 9, switches the polarity signal CRS to "H" after a specific output high impedance (Hi-Z) period has elapsed.

Just prior to the polarity signal CRS being switched to "H", the drive control section 10 applies the voltage VDM1 as the control signal voltage SOGRAD to the gates of the guard transistors MPSOG1, MPSOG2 of the source amplifier 121 for a specific transition period. Together therewith, the drive control section 10 applies the voltage VDM2 as the control signal voltage SIGRAD to the gates of the guard transistors MNSOG1, MNSOG2 of the sink amplifier 122 for a specific transition period. Note that, the same voltage VDM may be applied to the guard transistors MPSOG1, MPSOG2, MNSOG1, MNSOG2.

The voltage VDM1 is thereby applied to the gate of the guard transistor MPSOG1 of the source amplifier 121. Consequently, the output signal voltage SOOUT of the first output circuit 304 does not become less than the voltage VDM1. In addition, as the output signal voltage SOOUT approaches close to the voltage VDM1, the guard transistor MPSOG1 adopts a cut-off state. As a result thereof current does not flow in the forward direction.

The voltage VDM2 is also applied to the gate of the guard transistor MNSOG1 of the sink amplifier 122. Consequently, the output signal voltage STOUT of the first output circuit 404 does not exceed the voltage VDM2. In addition, as the output signal voltage STOUT approaches close to the voltage VDM2, the guard transistor MNSOG1 adopts a cut-off state. As a result thereof current does not flow in the forward direction.

Accordingly, in the display panel driving apparatus according to the present exemplary embodiment, the output signal voltage SOAMP of the source amplifier 121 is prevented from straying outside the output range thereof (SOURCE-AMP output range), and the output signal voltage STAMP of the sink amplifier 122 is prevented from straying outside the output range thereof (SINK-AMP output range). Consequently, in the display panel driving apparatus according to the present exemplary embodiment, situations in which latch up occurs, and the circuit is damaged unless power supply can be interrupted, can be prevented.

The gates of the guard transistor MPSOG2 of the source amplifier 121 and the guard transistor MNSOG2 of the sink amplifier 122 are also controlled in a similar manner to those of the guard transistor MPSOG1 and guard transistor MNSOG1 described above. Thereby, for a similar reason as described above, in the display panel driving apparatus according to the present exemplary embodiment, the connection points MNOG1 and MPOG11 can be prevented from becoming less than voltage VDM1, and from exceeding voltage VDM2. Consequently, in the display panel driving apparatus according to the present exemplary embodiment, situations in which latch up occurs, and the circuit is damaged unless power supply can be interrupted, can be prevented.

The drive control section 10 then, after a transition period has elapsed, applies the voltage VSS as the control signal voltage SOGRAD to the gates of the guard transistors MPSOG1, MPSOG2 of the source amplifier 121. Together with this, the drive control section 10 also, after a transition period has elapsed, applies the voltage VDD to the guard transistors MNSOG1, MNSOG2 of the sink amplifier 122 as the control signal voltage SIGRAD.

In this manner, when switching over polarity, the drive control section 10 provides a transition period, and makes the voltage of guard transistors, provided respectively between the first output circuits and the second output circuits in the source amplifier 121 and the sink amplifier 122, an intermediate voltage. Consequently, in the display panel driving apparatus according to the present exemplary embodiment, the output of the source amplifier 121 and the sink amplifier 122 can be prevented from exceeding the output ranges thereof.

However, in the source amplifier 121, the level shifter 310 is provided between the gate of the PMOS transistor MPO1 of the first output circuit 304 and the gate of the PMOS transistor MPO2 of the second output circuit 308. The electrical current flowing in the PMOS transistor MPO2 thereby becomes larger. Therefore, in the display panel driving apparatus according to the present exemplary embodiment, the waveform of the rise-up of the output signal voltage OUT can be made a steep waveform. Consequently, the through-rate in the display panel driving apparatus according to the present exemplary embodiment can be raised.

Note that, there is no level shifter like the one described above provided between the gate of the NMOS transistor MNO1 of the first output circuit 304 and the gate of the NMOS transistor MNO2 of the second output circuit 308. In the present exemplary embodiment, the voltage VDM is applied to the back gate of the NMOS transistor MNO1, and the voltage VSS is applied to the back gate of the NMOS transistor MNO2, and a potential difference is generated between the respective NMOS transistor back gates. This results in the present exemplary embodiment having a similar functionality to that when a level shifter is provided.

In the sink amplifier 122, the level shifter 410 is provided between the gate of the NMOS transistor MNO11 of the first output circuit 404 and gate of the NMOS transistor MNO12 of the second output circuit 408. The current flowing in the NMOS transistor MNO12 thereby becomes larger. Therefore, in the display panel driving apparatus according to the present exemplary embodiment, the waveform of the rise-up of the output signal voltage OUT can be made a steep waveform. Consequently, the through-rate in the display panel driving apparatus according to the present exemplary embodiment can be raised.

Note that, there is no level shifter like the one described above provided between the gate of the PMOS transistor MPO11 of the first output circuit 404 and the gate of the PMOS transistor MPO12 of the second output circuit 408. In the present exemplary embodiment, the voltage VDM is applied to the back gate of the PMOS transistor MPO11, and the voltage VDD is applied to the back gate of the PMOS transistor MPO12, and a potential difference is generated between the respective PMOS transistor back gates. This results in the present exemplary embodiment having a similar functionality to that when a level shifter is provided.

Note that, in the present exemplary embodiment, a configuration has been explained in which the level shifter 310 is provided to the source amplifier 121, and the level shifter 410 is provided to the sink amplifier 122. However, in another exemplary embodiment, configuration may be made in which at least one of the level shifters is omitted.

Following from the above description and embodiments, it should be apparent to those of ordinary skill in the art that, while the methods and apparatuses herein described constitute exemplary embodiments of the present disclosure, the disclosure is not necessarily limited to the precise embodiments and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the disclosure discussed herein in order to fall within the scope of any claims, since the invention is defined by the claims and since inherent and/or unforeseen advantages of the present disclosure may exist even though they may not have been explicitly discussed herein.

What is claimed is:

1. A display panel driving apparatus comprising:

a high voltage side operational amplifier that outputs a voltage between a highest voltage that is an upper limit to a specific power source range and a first intermediate voltage that is a voltage between the highest voltage and a lowest voltage that is the lowest limit of the specific power source range, the high voltage side operational amplifier comprising, a high voltage side difference circuit that outputs a signal based on a difference between a high voltage side driving signal for driving display cells of a display panel and a specific input signal, a first high voltage side output circuit that includes a first PMOS transistor and a first NMOS transistor connected in series and input with a signal output from the high voltage side difference circuit, the first PMOS transistor and the first NMOS transistor both having a first specific withstand voltage that is a withstand voltage of at least the difference between the highest voltage and the first intermediate voltage, a second high voltage side output circuit that includes a second PMOS transistor and a second NMOS transistor connected in series and input with a signal output from the first high voltage side output circuit, the second PMOS transistor and the second NMOS transistor both having a second specific withstand voltage that is a withstand voltage of at least the difference between the highest voltage and the lowest voltage, and a voltage-drop prevention MOS transistor, provided between the first high voltage side output circuit and the second high voltage side output circuit, that prevents a voltage of a specific portion of the first high voltage side output circuit from becoming lower than the first intermediate voltage;

a low voltage side operational amplifier that outputs a voltage between the lowest voltage and a second intermediate voltage that is a voltage between the highest voltage and the lowest voltage, the low voltage side operational amplifier comprising, a low voltage side difference circuit that outputs a signal based on a difference between a low voltage side driving signal for driving the display cells and a specific input signal, a first low voltage side output circuit that includes a third PMOS transistor and a third NMOS transistor connected in series and input with a signal output from the low voltage side difference circuit, the third PMOS transistor and the third NMOS transistor both having a third specific withstand voltage that is a withstand voltage of at least the difference between the second intermediate voltage and the lowest voltage, a second low voltage side output circuit that includes a fourth PMOS transistor and a fourth NMOS transistor connected in series and input with a signal output from the first low voltage side output circuit, the fourth PMOS transistor and the fourth NMOS transistor both having the second specific withstand voltage, and a voltage-rise prevention MOS transistor, provided between the first low voltage side output circuit and the second low voltage side output circuit, that prevents a voltage of a specific portion of the first low voltage side output circuit from becoming higher than the second intermediate voltage; and a switching circuit that switches a signal output to the display cells between an output signal from the high voltage side operational amplifier and an output signal from the low voltage side operational amplifier, based on a specific polarity signal.

2. The display panel driving apparatus of claim 1, wherein the voltage-drop prevention MOS transistor is provided between a connection point of a drain of the first PMOS transistor and a drain of the first NMOS transistor, and a connection point of a drain of the second PMOS transistor and a drain of the second NMOS transistor.

3. The display panel driving apparatus of claim 1, wherein the voltage-drop prevention MOS transistor is provided between a gate of the first NMOS transistor and a gate of the second NMOS transistor.

4. The display panel driving apparatus of claim 1, wherein the voltage-rise prevention MOS transistor is provided between a connection point of a drain of the third PMOS transistor and a drain of the third NMOS transistor, and a connection point of a drain of the fourth PMOS transistor and a drain of the fourth NMOS transistor.

5. The display panel driving apparatus of claim 1, wherein the voltage-rise prevention MOS transistor is provided between a gate of the third NMOS transistor and a gate of the fourth NMOS transistor.

6. The display panel driving apparatus of claim 1, further comprising a voltage applicator that, when the polarity signal is inverted, applies the first intermediate voltage to a gate of the voltage-drop prevention MOS transistor for a specific period and applies the second intermediate voltage to a gate of the voltage-rise prevention MOS transistor for the specific period.

7. The display panel driving apparatus of claim 1, wherein the first intermediate voltage is lower than the second intermediate voltage.

8. The display panel driving apparatus of claim 1, further comprising a first level shifter, provided between the first PMOS transistor and the second PMOS transistor, and including a fifth PMOS transistor and a sixth PMOS transistor connected in series.

9. The display panel driving apparatus of claim 1, further comprising a second level shifter, provided between the third NMOS transistor and the fourth NMOS transistor, and including a fifth NMOS transistor and a sixth NMOS transistor connected in series.

10. The display panel driving apparatus of claim 1, wherein the first intermediate voltage is applied to a back gate of the first NMOS transistor, and the lowest voltage is applied to a back gate of the second NMOS transistor.

11. The display panel driving apparatus of claim 1, wherein the second intermediate voltage is applied to a back gate of the third PMOS transistor, and the highest voltage is applied to a back gate of the fourth PMOS transistor.

* * * * *